US012494149B2

(12) United States Patent
Qian et al.

(10) Patent No.: US 12,494,149 B2
(45) Date of Patent: Dec. 9, 2025

(54) GAMMA DEBUGGING METHOD AND DEVICE, DISPLAY PANEL AND DRIVING METHOD, AND DISPLAY DEVICE

(71) Applicant: Wuhan Tianma Micro-Electronics Co., Ltd., Wuhan (CN)

(72) Inventors: Li Qian, Wuhan (CN); Panpan Li, Wuhan (CN)

(73) Assignee: Wuhan Tianma Micro-Electronics Co., Ltd., Wuhan (CN)

( * ) Notice: Subject to any disclaimer, the term of this patent is extended or adjusted under 35 U.S.C. 154(b) by 0 days.

(21) Appl. No.: 18/758,075

(22) Filed: Jun. 28, 2024

(65) Prior Publication Data

US 2025/0218326 A1 Jul. 3, 2025

(30) Foreign Application Priority Data

Dec. 29, 2023 (CN) ........................ 202311872730.6

(51) Int. Cl.
*G09G 3/20* (2006.01)
*G09G 3/00* (2006.01)
*G09G 3/3208* (2016.01)

(52) U.S. Cl.
CPC ........... *G09G 3/2007* (2013.01); *G09G 3/006* (2013.01); *G09G 3/3208* (2013.01); *G09G 2320/041* (2013.01); *G09G 2320/0673* (2013.01); *G09G 2380/10* (2013.01)

(58) Field of Classification Search
CPC .... G09G 3/2007; G09G 3/006; G09G 3/3208; G09G 2320/041; G09G 2320/0673; G09G 2380/10
See application file for complete search history.

(56) References Cited

U.S. PATENT DOCUMENTS

| | | | | |
|---|---|---|---|---|
| 7,355,577 B1 * | 4/2008 | Bell | G09G 3/3611 | 345/98 |
| 11,164,504 B2 * | 11/2021 | Okamoto | G09G 3/3208 | |
| 11,862,111 B1 * | 1/2024 | Na | G09G 3/3291 | |
| 2007/0262972 A1 * | 11/2007 | Nakata | G09G 3/3696 | 345/204 |
| 2011/0199401 A1 * | 8/2011 | Fujiwara | G09G 3/3426 | 345/102 |
| 2012/0188266 A1 * | 7/2012 | Sakai | G09G 3/025 | 345/589 |

(Continued)

*Primary Examiner* — Jose R Soto Lopez
(74) *Attorney, Agent, or Firm* — Anova Law Group, PLLC

(57) ABSTRACT

A Gamma debugging method includes: under a standard temperature condition, testing N reference samples to obtain standard Gamma data of the N reference samples with respect to a target Gamma curve; under test temperature conditions, testing the N reference samples to obtain reference Gamma data of the N reference samples; determining Gamma adjustment amounts of the reference samples under the test temperature conditions based on the reference Gamma data and standard Gamma data; establishing a relationship table between test temperatures and Gamma adjustment amounts; obtaining Gamma data at the standard temperature and current temperature information of a target sample; and, based on the Gamma data of the target sample at the standard temperature and the Gamma adjustment amount corresponding to the current temperature information, determining a current driving voltage value of the target sample.

18 Claims, 12 Drawing Sheets

(56) References Cited

U.S. PATENT DOCUMENTS

| | | | | |
|---|---|---|---|---|
| 2013/0321361 | A1* | 12/2013 | Lynch | H10K 59/65 345/204 |
| 2014/0292823 | A1* | 10/2014 | Lee | G09G 3/3225 345/82 |
| 2015/0055025 | A1* | 2/2015 | Gotoh | G09G 3/3426 345/694 |
| 2015/0228242 | A1* | 8/2015 | Kim | G09G 3/3696 345/206 |
| 2020/0060004 | A1* | 2/2020 | Baumheinrich | H05B 45/44 |
| 2021/0366369 | A1* | 11/2021 | Wei | G01K 1/026 |
| 2021/0407411 | A1* | 12/2021 | Yang | G01K 3/10 |
| 2023/0058388 | A1* | 2/2023 | Zhu | G09G 3/2074 |
| 2023/0230541 | A1* | 7/2023 | Kim | G09G 3/3208 345/698 |
| 2024/0249664 | A1* | 7/2024 | Wang | G09G 3/006 |
| 2024/0321181 | A1* | 9/2024 | Lin | G09G 3/32 |
| 2025/0046229 | A1* | 2/2025 | Wang | G09G 3/2074 |

* cited by examiner

GAMMA DEBUGGING METHOD AND DEVICE, DISPLAY PANEL AND DRIVING METHOD, AND DISPLAY DEVICE

CROSS-REFERENCE TO RELATED APPLICATION

This application claims the priority of Chinese Patent Application No. 202311872730.6, filed on Dec. 29, 2023, the content of which is incorporated herein by reference in its entirety.

TECHNICAL FIELD

The present disclosure generally relates to the field of display technology and, more particularly, relates to a Gamma debugging method and method thereof, a display panel and its driving method, and a display device.

BACKGROUND

With the development of display technology, structural devices with display functions, such as display panels, specifically organic light-emitting diode (OLED) display panels or liquid crystal display devices, are gradually being used in more scenarios.

In some application scenarios, light-emitting devices of different colors in the OLED display panels will be affected by the scenarios, resulting in changes in display visual effects and affecting display accuracy.

SUMMARY

One aspect of the present disclosure provides a Gamma debugging method. The method includes: under a standard temperature condition, testing N reference samples to obtain standard Gamma data of the N reference samples with respect to a target Gamma curve, where N≥1 and N is an integer; under test temperature conditions, testing the N reference samples to obtain reference Gamma data of the N reference samples; determining Gamma adjustment amounts of the reference samples under the test temperature conditions based on the reference Gamma data and standard Gamma data of the N reference samples; establishing a relationship table between test temperatures and Gamma adjustment amounts; obtaining Gamma data of a target sample at the standard temperature, and obtaining current temperature information of the target sample; and based on the Gamma data of the target sample at the standard temperature and the Gamma adjustment amount corresponding to the current temperature information, determining a current driving voltage value of the target sample.

Another aspect of the present disclosure provides a Gamma debugging device. The device includes: a first acquisition module, configured to: under a standard temperature condition, test N reference samples to obtain standard Gamma data of the N reference samples with respect to a target Gamma curve, where N≥1, and N is an integer; a second acquisition module, configured to: under test temperature conditions, test the N reference samples to obtain reference Gamma data of the N reference samples; an adjustment amount determination module, configured to: determine Gamma adjustment amounts of the reference samples under the test temperature conditions based on the reference Gamma data and standard Gamma data of the N reference samples; a relationship table determination module, configured to: establish a relationship table between test temperatures and Gamma adjustment amounts; a third acquisition module, configured to: obtain Gamma data of a target sample at the standard temperature and obtain current temperature information of the target sample; and a voltage determination module, configured to: based on the Gamma data of the target sample at the standard temperature and the Gamma adjustment amount corresponding to the current temperature information, determine a current driving voltage value of the target sample.

Another aspect of the present disclosure provides a driving method of a display panel. The method includes: obtaining a current driving voltage value; and driving the display panel based on the current driving voltage value.

Another aspect of the present disclosure provides a display panel. The display panel includes: a temperature acquisition component, a storage component and a control component. The temperature acquisition component is configured to obtain current temperature of the display panel and transmit it to the control component; and the storage component is configured to at least store a relationship table and standard temperature Gamma data. The control component is configured to obtain the current temperature, the relationship table and the Gamma data at the standard temperature, to execute: under a standard temperature condition, testing N reference samples to obtain standard Gamma data of the N reference samples with respect to a target Gamma curve, where N≥1 and N is an integer; under test temperature conditions, testing the N reference samples to obtain reference Gamma data of the N reference samples; determining Gamma adjustment amounts of the reference samples under the test temperature conditions based on the reference Gamma data and standard Gamma data of the N reference samples; establishing a relationship table between test temperatures and Gamma adjustment amounts; obtaining Gamma data of a target sample at the standard temperature, and obtaining current temperature information of the target sample; and based on the Gamma data of the target sample at the standard temperature and the Gamma adjustment amount corresponding to the current temperature information, determining a current driving voltage value of the target sample.

Another aspect of the present disclosure provides a display device. The display device includes a display panel. The display panel includes: a temperature acquisition component, a storage component and a control component. The temperature acquisition component is configured to obtain current temperature of the display panel and transmit it to the control component; and the storage component is configured to at least store a relationship table and standard temperature Gamma data. The control component is configured to obtain the current temperature, the relationship table and the Gamma data at the standard temperature, to execute: under a standard temperature condition, testing N reference samples to obtain standard Gamma data of the N reference samples with respect to a target Gamma curve, where N≥1 and N is an integer; under test temperature conditions, testing the N reference samples to obtain reference Gamma data of the N reference samples; determining Gamma adjustment amounts of the reference samples under the test temperature conditions based on the reference Gamma data and standard Gamma data of the N reference samples; establishing a relationship table between test temperatures and Gamma adjustment amounts; obtaining Gamma data of a target sample at the standard temperature, and obtaining current temperature information of the target sample; and based on the Gamma data of the target sample at the standard temperature and the Gamma adjustment amount corresponding to the current temperature information, determining a current driving voltage value of the target sample.

Other aspects or embodiments of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Figure 1:
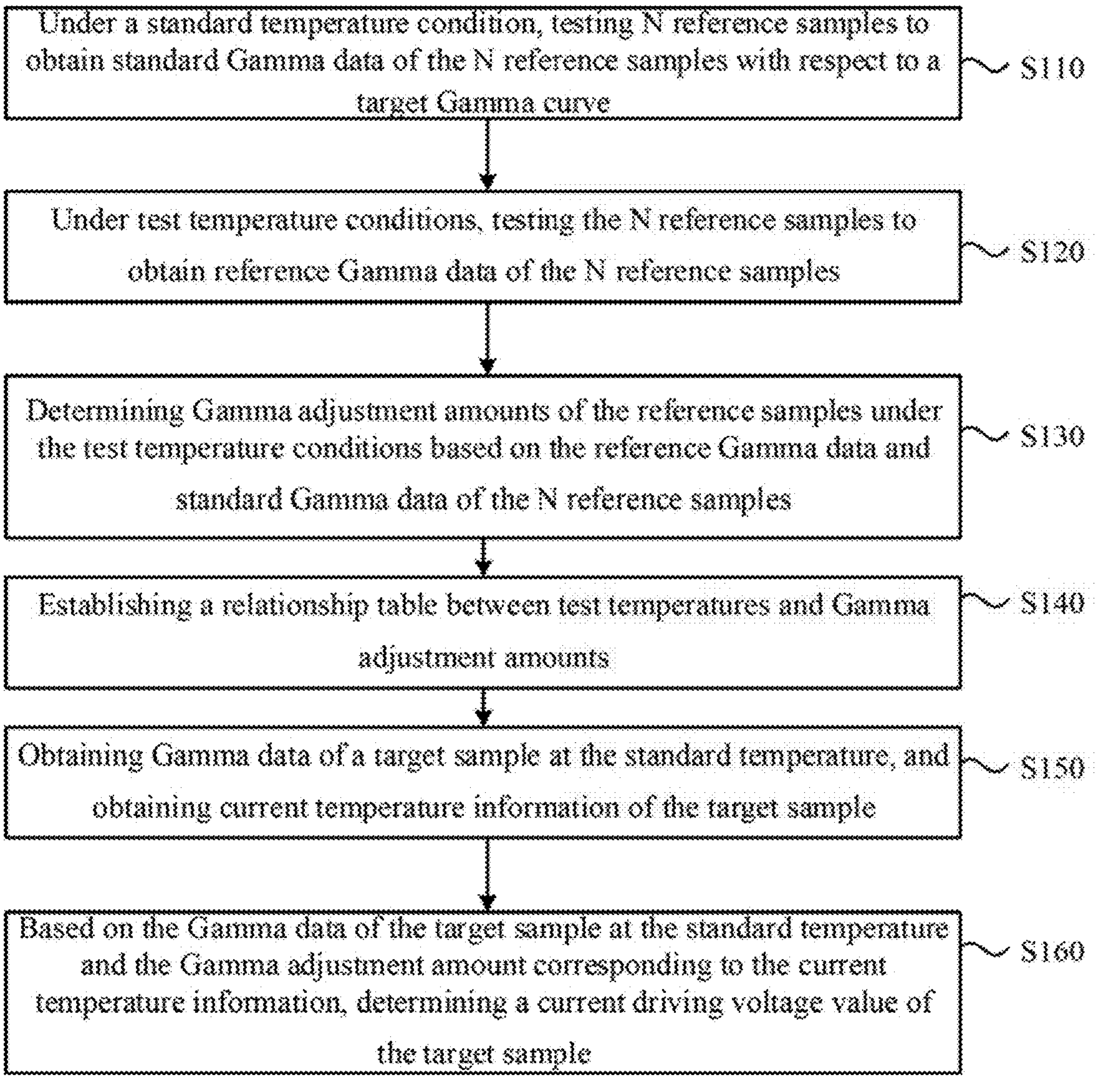
FIG. 1 illustrates a flowchart of an exemplary Gamma debugging method consistent with various disclosed embodiments in the present disclosure.

Reference will now be made in detail to exemplary embodiments of the disclosure, which are illustrated in the accompanying drawings. Hereinafter, embodiments consistent with the disclosure will be described with reference to drawings. In the drawings, the shape and size may be exaggerated, distorted, or simplified for clarity. Wherever possible, the same reference numbers will be used throughout the drawings to refer to the same or like parts, and a detailed description thereof may be omitted.

Further, in the present disclosure, the disclosed embodiments and the features of the disclosed embodiments may be combined under conditions without conflicts. It is apparent that the described embodiments are some but not all of the embodiments of the present disclosure. Based on the disclosed embodiments, persons of ordinary skill in the art may derive other embodiments consistent with the present disclosure, all of which are within the scope of the present disclosure.

Moreover, the present disclosure is described with reference to schematic diagrams. For the convenience of descriptions of the embodiments, the cross-sectional views illustrating the device structures may not follow the common proportion and may be partially exaggerated. Besides, those schematic diagrams are merely examples, and not intended to limit the scope of the disclosure. Furthermore, a three-dimensional (3D) size including length, width, and depth should be considered during practical fabrication.

In the present disclosure, relational terms such as first and second are only used to distinguish one entity or operation from another entity or operation, and do not necessarily require or imply any such actual relationship between these entities or operations or order. Moreover, the terms "including", "comprising" or any other variants thereof are intended to cover non-exclusive inclusion, such that a process, method, article, or device that includes a series of elements includes not only those elements, but also those that are not explicitly listed or also include elements inherent to this process, method, article or equipment. If there are no more restrictions, the elements defined by the sentence "including . . . " do not exclude the existence of other same elements in the process, method, article, or equipment that includes the elements.

It should be understood that when describing the structure of a component, when a layer or region is referred to as being "on" or "above" another layer or another region, the layer or region may be directly on the other layer or region, or indirectly on the other layer or region, for example, layers/components between the layer or region and another layer or another region. And, for example, when the component is reversed, the layer or region may be "below" or "under" the other layer or region. In the present disclosure, the term "electrical connection" refers to that two components are directly electrically connected with each other, or the two components are electrically connected via one or more other components.

Embodiments of the present disclosure relate to the technical field of display (also referred to as image display). The embodiments of the present disclosure may be applied to vehicle display technology, for example, to realize medium-sized vehicle OLED Gamma debugging.

With the rapid development of autonomous mobile devices such as vehicles, in the field of display technology, OLED or liquid crystal display devices are used as vehicle-mounted displays because of their excellent properties such as high luminous efficiency, good high and low-temperature characteristics, high resolution, wide visual width, and curved surfaces, and quickly enter the visual fields of more people. The vehicle types to which the vehicle-mounted display may be applied include new energy vehicles, hybrid vehicles, fuel vehicles or other vehicle types known to those skilled in the art, which are not limited here.

Compared with displays such as mobile phones or tablets, vehicle-mounted displays put forward more stringent tests on visual effects at different temperatures. When a display panel is used in a display device/device, before the display panel leaves the factory, the brightness of each grayscale needs to be debugged according to a predetermined Gamma curve, that is, a target Gamma curve, such that each brightness level of the display panel meets the target, to ensure that the display panel and corresponding display device are able to accurately display details of different brightnesses in a displayed image when displaying images.

Figure 19:
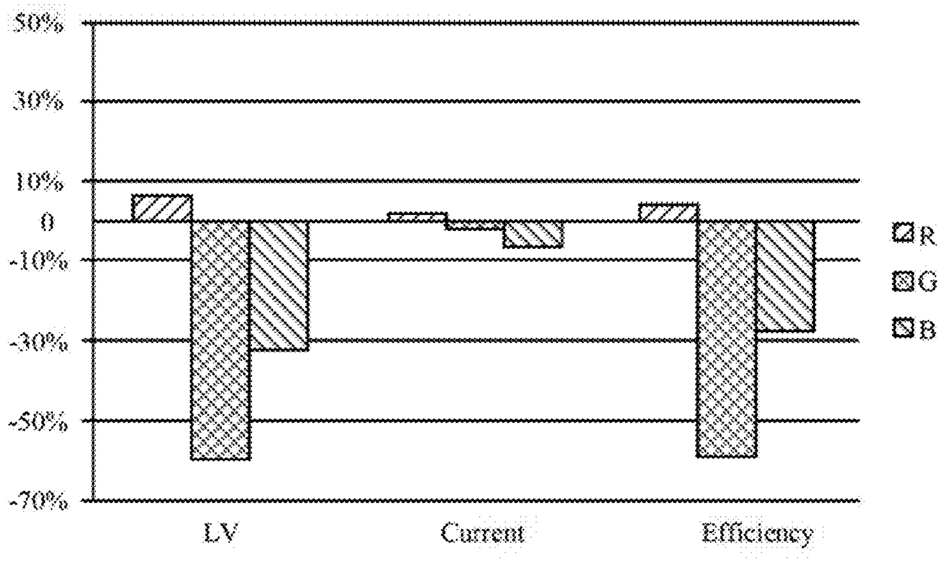
FIG. 19 illustrates a schematic diagram of changes with heat of light-emitting devices of different colors in existing technologies.

In existing technologies, Gamma debugging is generally performed on a display panel (which may also be called a screen) at normal temperature. The screen is affected by temperature changes under extremely high or low temperature conditions. The mobility of electrons or holes in the OLED device will change, causing recombination centers to move and resulting in changes in luminous efficiency, thus affecting the visual effects of the display panel. For example, the degree of change in the luminescence parameters of light-emitting devices of different colors, such as red (R), green (G), and blue (B) light-emitting devices after heating relative to before heating, is shown in FIG. 19. The luminescence parameters include luminance (LV, screen brightness), current or efficiency. The vertical axis represents the change percentage. The calculation method of the change percentage is: (test data before heating-test data after heating)/test data before heating×100%. It can be seen from FIG. 19 that the luminous efficiency attenuation percentage has little difference between different display panels. At present, it is impossible to perform Gamma debugging at different temperatures for each screen on the production line; and due to process reasons, there are differences between different display panels, that is, between different screens, and the Gamma of a certain screen cannot be used as the public version of Gamma data.

The present disclosure provides a Gamma debugging method to at least partially alleviate the above problems. Based on the Gamma data of the N reference samples under the standard temperature condition and test temperature conditions with respect to the target Gamma curve, the Gamma adjustment amounts corresponding to different test temperature conditions may be determined, and a relationship table between the test temperatures and the Gamma adjustment amounts may be further established. Subsequently, for the target sample, the Gamma data at the standard temperature may be obtained, and the Gamma adjustment amounts may be used for compensation to obtain the current driving voltage value corresponding to the current temperature information of the target sample. The application scenarios such as the impact of temperature conditions on light-emitting devices may be improved. Visual effects may be improved, the target Gamma curve may be satisfied, and display accuracy may be improved.

FIG. 1 shows a flowchart of an exemplary Gamma debugging method provided by one embodiment of the present disclosure. As shown in FIG. 1, in one embodiment, the Gamma debugging method may include S110 to S160.

In S110, in a standard temperature condition, test may be performed on N reference samples, to obtain standard Gamma data of the N reference samples corresponding to a target Gamma curve.

In one embodiment, N≥1 and N may be an integer. In some embodiments, for example, N may be 1, 2, 5, 8, 10, 15, 20, or another number. The present disclosure has no limit on this.

The reference samples may be samples for providing Gamma compensation data. For example, in some embodiments, the reference samples may be display panels. The N reference samples may be N display panels determined from a same display motherboard, which will be described following with reference to FIG. 2 to FIG. 4.

The target Gamma curve may be a Gamma curve that meets the display requirements. For example, the target Gamma curve may include a Gamma2.2 curve, or may include other Gamma curves, which are not limited here.

The N reference samples may be tested separately under the standard temperature condition to obtain the standard Gamma data of each reference sample corresponding to the target Gamma curve. For example, N sets of standard driving voltage values for different brightnesses corresponding to the target Gamma curve may be obtained.

In S120, in test temperature conditions, the N reference samples may be tested to obtain reference Gamma data of the N reference samples.

The test temperature conditions may be other temperatures or temperature levels in addition to the standard temperature conditions within the applicable temperature range of the reference samples. The test temperature conditions may include one or more temperatures or temperature levels. For example, when the standard temperature condition is normal temperature, the test temperature conditions may include one or more low-temperature conditions or one or more high-temperature conditions, to facilitate testing and ensure that the test accuracy meets the requirements.

In the test temperature conditions, the N reference samples may be tested respectively, to obtain the reference Gamma data of each reference sample, that is, for example, to obtain the N sets of reference driving voltage values.

In some other embodiments, the execution order of the above S120 and S110 may be exchanged, that is, S120 may be executed first, and then S110 may be executed. The present disclosure has no limit on this.

In S130, according to the reference Gamma data and standard Gamma data of the N reference samples, Gamma adjustment amounts of the reference samples under the test temperature conditions may be determined.

The Gamma adjustment amounts may also be called Gamma compensation data, which are used to compensate the reference Gamma data under test temperature conditions such that the reference samples still meet the target Gamma curve under the test temperature conditions, thereby achieving precise control of the display effect and improving the display visual effect.

The reference Gamma data of the N reference samples may be calculated statistically compared with the standard Gamma data, and the Gamma adjustment amounts of the reference samples under the test temperature conditions may be obtained. The specific calculation and statistical process will be described in detail later.

In S140, a relationship table between test temperature and Gamma adjustment amounts may be established.

In some embodiments, the test temperature conditions may be several intermittent temperatures or temperature levels. Based on the Gamma adjustment amounts under the aforementioned test temperature conditions, a correlation between successive different test temperatures and the Gamma adjustment amounts may be established. For example, the difference between two adjacent temperatures in consecutive different test temperatures may be equal or unequal. The correlation between the test temperatures and the Gamma adjustment amounts may be reflected in the form of a relationship table or a functional relationship, which is not limited.

Test may be performed on the N reference samples under the standard temperature condition and the test temperature conditions, the standard Gamma data and the reference Gamma data may obtained, and the Gamma adjustment amounts may be further obtained accordingly. The relationship table between the test temperatures and the Gamma adjustment amounts may be established, to provide a data reference for determining the driving voltage of the target sample subsequently. Therefore, the target sample may be able to meet the target Gamma curve and improve the visual effect through data compensation of the Gamma adjustment amounts at different temperatures. An exemplary description is given below in conjunction with S150 and S160.

In S150, Gamma data of the target sample at the standard temperature and the current temperature information of the target sample may be obtained.

The target sample may be a sample that is able to be Gamma compensated. In one embodiment, the target sample may be a sample that is able to be mass-produced and shipped, that is, a sample that will be actually used. The target sample and the reference samples may be of the same type. For example, they may be both display panels. The standard temperature may be a normal temperature, and the Gamma data at the standard temperature may meet the target Gamma curve. The current temperature information may be information used to characterize the current temperature of the target sample in the current scenario. The current temperature and the standard temperature may be the same or different. The current temperature may specifically be normal temperature or high or low temperature, which is not limited here.

The Gamma data of the target sample that satisfies the target Gamma curve at the normal temperature may be obtained, and the current temperature information of the target sample in the current scenario may be obtained also, to perform Gamma compensation for the current temperature and obtain the driving voltage values at different current temperatures that meet the target Gamma curve.

In S160, based on the Gamma data of the target sample at the standard temperature and the Gamma adjustment amount corresponding to the current temperature information, a current driving voltage value of the target sample may be determined.

The Gamma adjustment amount corresponding to the current temperature information may be obtained based on the relationship table between the test temperatures and the Gamma adjustment amounts established previously, which will be explained in detail later.

The Gamma adjustment amount corresponding to the current temperature information may be used to compensate the Gamma data at the standard temperature, to obtain the driving voltage value that satisfies the target Gamma curve at the current temperature, that is, to obtain the current driving voltage value. Driven by the current driving voltage value, all levels of luminescence brightness of the target sample may meet the target Gamma curve, thereby achieving precise control of the target sample and improving visual effects.

In the Gamma debugging method provided by the embodiments of the present disclosure, the Gamma adjustment amounts corresponding to different test temperature conditions may be determined based on the Gamma data of the target Gamma curve of the N reference samples under the standard temperature condition and the test temperature conditions. The relationship table between temperatures and Gamma adjustment amounts may be further established. Then, for the target sample, the Gamma data at the standard temperature may be obtained and the Gamma adjustment amount may be used for compensation, to obtain the current driving voltage value corresponding to the current temperature information of the target sample, thereby improving the application scenarios, reducing the impact of temperature conditions on light-emitting devices, improving visual effects, meeting the target Gamma curve, and improving display accuracy.

Figure 2:
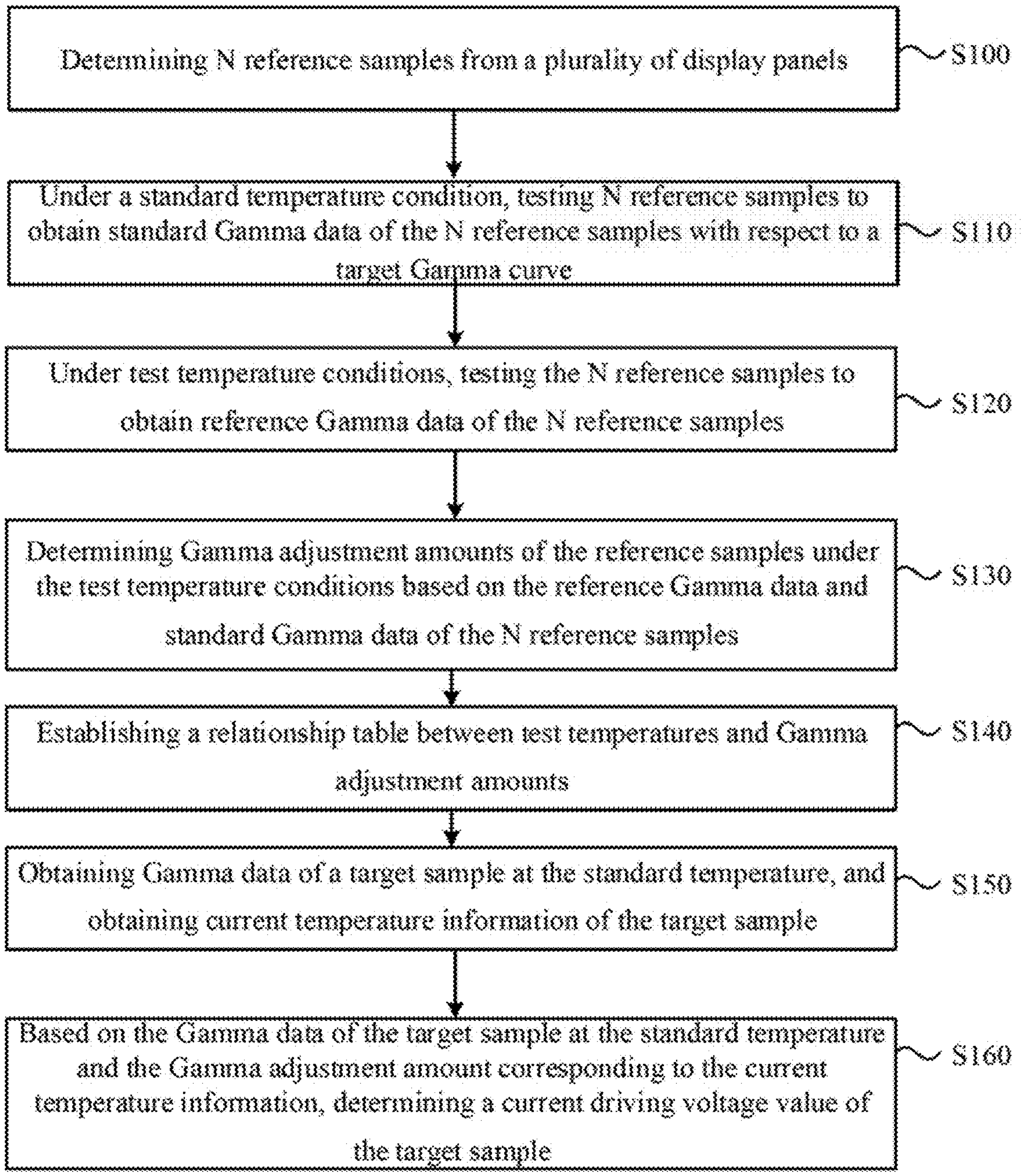
FIG. 2 illustrates another flowchart of an exemplary Gamma debugging method consistent with various disclosed embodiments in the present disclosure.

In some embodiments shown in FIG. 2 which is a flowchart of another Gamma debugging method, before testing the N reference samples, the method may further include:

S100: determining the N reference samples from a plurality of display panels.

In one embodiment, the plurality of display panels may be obtained by cutting at least one display motherboard.

Figure 3:
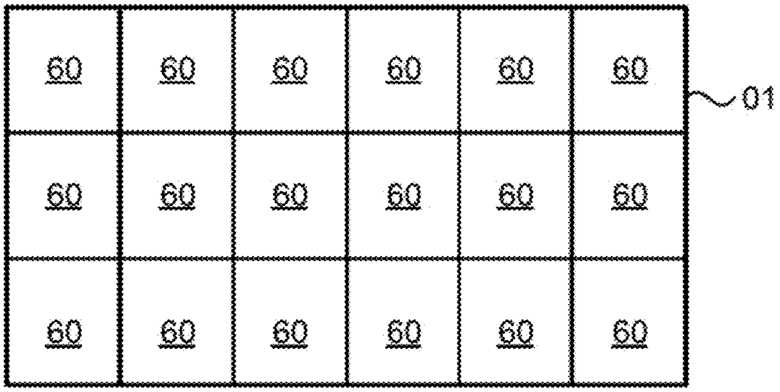
FIG. 3 illustrates a structural diagram of an exemplary display motherboard consistent with various disclosed embodiments in the present disclosure.

FIG. 3 is a schematic structural diagram of a display motherboard provided by one embodiment of the present disclosure. As shown in FIG. 3, the display motherboard 01 may include a plurality of display panels 60. The display motherboard 01 may be cut to form the plurality of independent display panels 60, and reference samples may be selected from the plurality of display panels 60. For example, in one embodiment, the N reference samples may be determined in one same display motherboard 01. For example, the plurality of display panels 60 cut from the same display motherboard 01 may be all used as reference samples. In some other embodiments, the reference samples may be selected from different display motherboard 01 and a total of N reference samples may be determined, which are not limited here.

The embodiments shown in FIG. 3 where the display motherboard 01 includes 18 display panels 60 arranged in 3 rows and 6 columns are only used as examples to illustrate the present disclosure, but do not limit the display motherboard 01 and the display panels 60. In other embodiments, the number and arrangement of the display panels 60 in the display motherboard 01 may also be other numbers and arrangements known to those skilled in the art, which will not be described in detail or limited here.

In the present disclosure, by determining the N reference samples from the plurality of display panels cut from the at least one display motherboard, Gamma compensation for temperatures for each display panel in the at least one display motherboard may be implemented, to implement Gamma compensation for the temperature for other display panels cut from display motherboards in the same batch. Therefore, the mass-produced display panels may meet the target Gamma curve through Gamma compensation at different temperatures, thereby improving visual effects.

Other processes shown in FIG. 2 may be same as FIG. 1, and may be understood with reference to the previous descriptions in FIG. 1, which will not be described again here.

Figure 4:
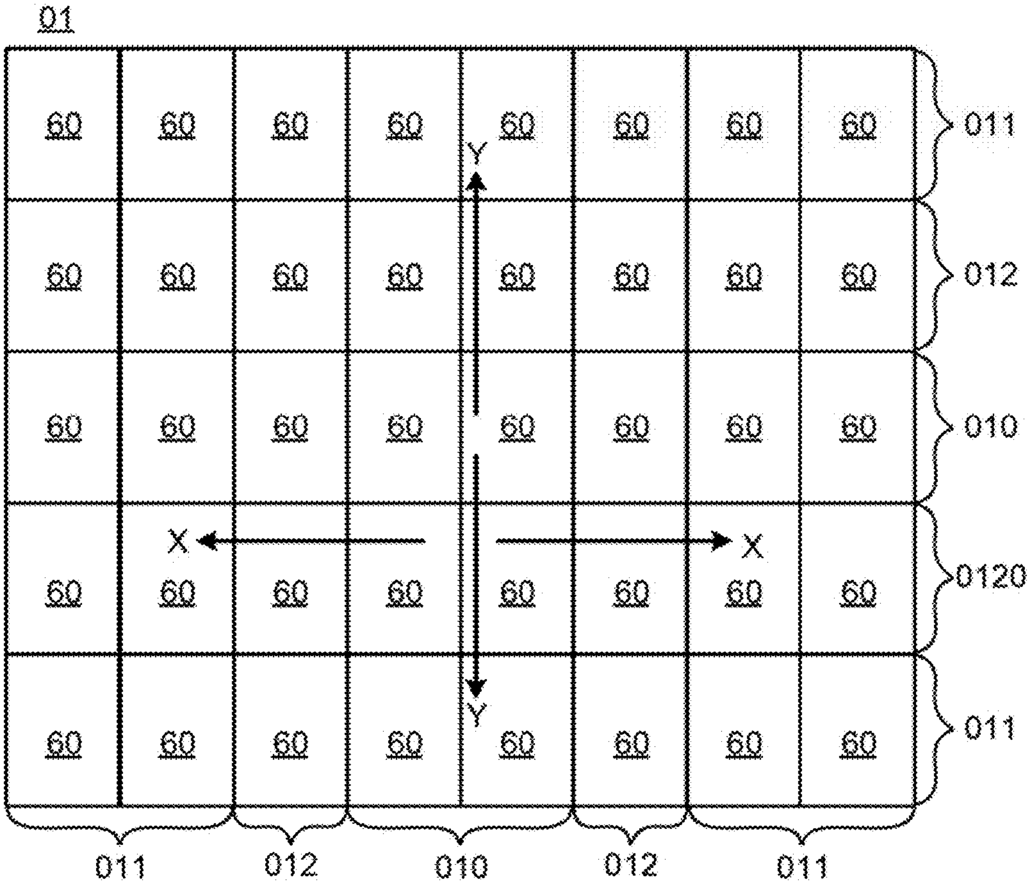
FIG. 4 illustrates another structural diagram of an exemplary display motherboard consistent with various disclosed embodiments in the present disclosure.

In another embodiment shown in FIG. 4 which is a structure of another display motherboard, the display motherboard 01 may include a central area 010, an edge area 011 located on at least one side of the central area 010, and at least one intermediate area 012 between the central area 010 and the at least one edge area 011 along the direction from the central area 010 to the at least one edge area 011. For example, taking the orientation shown in FIG. 4 as an example, the direction from the central area 010 to the at least one edge area 011 may be the left direction or the right direction in FIG. 4, which is shown as a first direction X. A starting point of the first direction X may be in the central area 010 and an endpoint may be in the edge area 011. In other embodiments, the direction from the central area 010 to the at least one edge area 011 may be the upward direction or the downward direction in FIG. 4, which is shown as second direction Y in FIG. 4. In some other embodiment, the at least one edge area 011 may surround the central area 010, and the direction from the central area 010 to the at least one edge area 011 may be in any radial direction where the starting point of the radial direction is at the center area 010 and the endpoint is in the at least one edge area 011. There is no limit here.

The embodiments shown in FIG. 4 where the display motherboard 01 includes 40 display panels 60 arranged in 5 rows and 8 columns are only used as examples to illustrate the present disclosure. And along the left and right direction, there are edge areas 011 and intermediate areas 012 on both sides of the central area 010, and in the up and down direction, there are edge areas 011 and intermediate areas 012 on both sides of the central area 010. These do not limit the display motherboard 01 and the display panels 60. In other embodiments, the number and arrangement of the display panels 60 in the display motherboard 01 can also be other numbers and arrangements known to those skilled in the art, which will not be described in detail or limited here.

In various embodiments, in the display motherboard 01, the center area 010, the intermediate areas 012 and the edge areas 011 may have same or different width in one direction, which is not limited here. For example, in one embodiment shown in FIG. 4, the direction may be left-right directions or upward-downward directions in FIG. 4.

As shown in FIG. 2, in one embodiment, S110 may include:

determining at least one display panel in the center area, the intermediate areas and the edge areas from one same display motherboard as the reference samples.

In one embodiment, at least one display panel in at least one area of the center area, the intermediate areas and the edge areas from one same display motherboard may be selected as the reference samples. For example, at least one display panel in the center area may be selected as the reference samples, or at least one display panel in the edge areas may be selected as the reference samples, or at least one display panel in the center area and the intermediate areas may be selected as the reference samples, or at least one display panel in the center area and the edge areas may be selected as the reference samples, or at least one display panel in the intermediate areas and the edge areas may be selected as the reference samples, or at least one display panel in the center area, the intermediate areas and the edge areas may be selected as the reference samples. In some embodiments, the selected at least one area may include two areas and at least one display panel may be selected from each area as the reference samples.

In one embodiment shown in FIG. 4, in the display motherboard 01, at least one display panel 60 may be determined in the central area 010, the middle area 012, and the edge area 011 respectively, as the reference samples, such that full coverage of different areas of the display master 01 may be achieved to improve the testing accuracy of the Gamma change pattern in response to the temperature of the display master 01. The accuracy of Gamma compensation at different temperatures and visual effects may be improved.

In the present disclosure, the N reference samples may be selected from display panels including the edge, center or other positions of the display motherboard. The number of reference samples may be controlled according to the differences in the positions of the display master, thereby improving test accuracy. Also, it may be ensured that the workload of testing and statistical calculations may be not excessive, thereby achieving high debugging efficiency.

Figure 5:
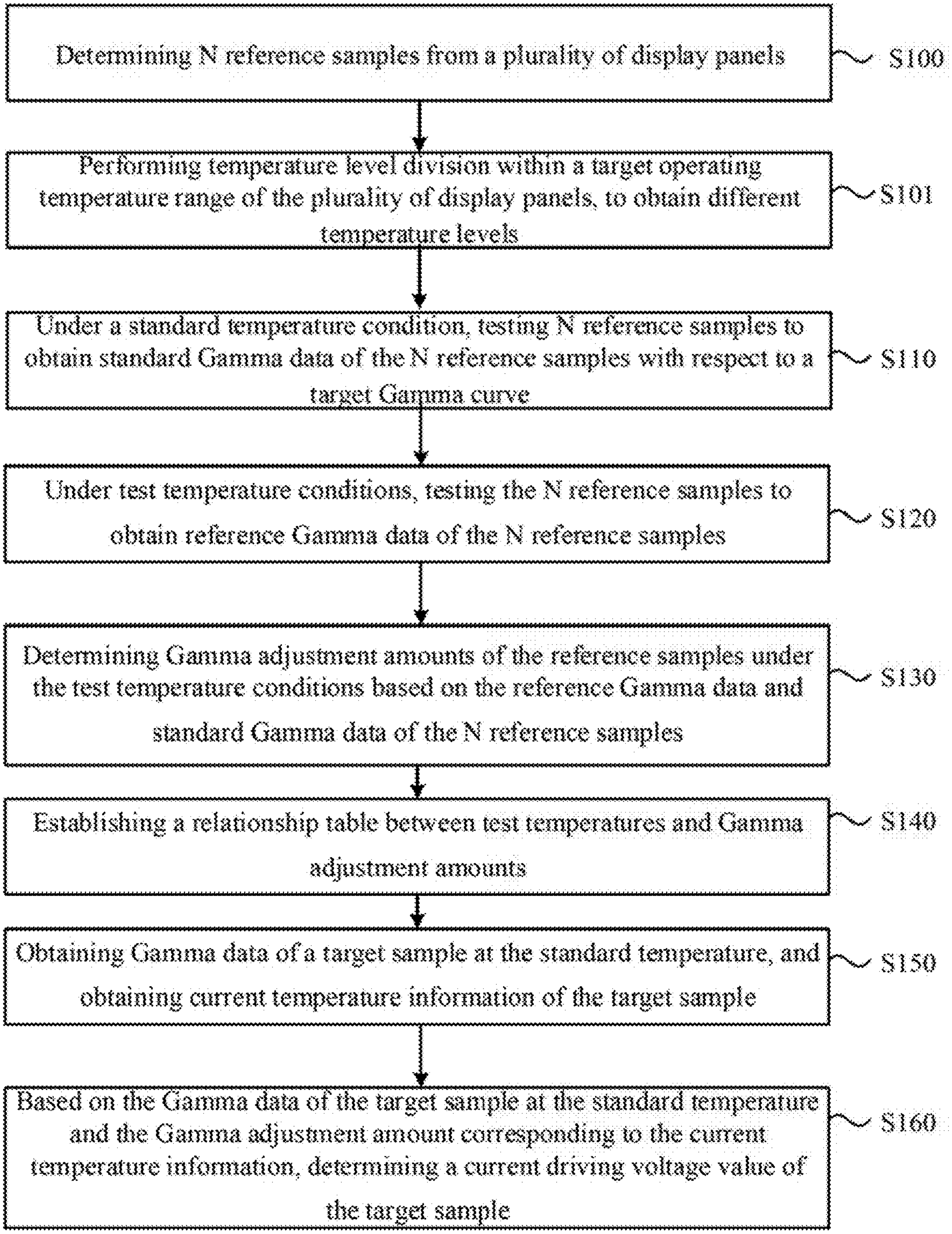
FIG. 5 illustrates another flowchart of an exemplary Gamma debugging method consistent with various disclosed embodiments in the present disclosure.

In another embodiment, as shown in FIG. 5 which is a flowchart of another Gamma debugging method, based on FIG. 2, before performing test on the N reference samples, the Gamma debugging method may further include:

S101: dividing temperatures within the target operating temperature range of the display panel to obtain different temperature levels.

In one embodiment, the temperature levels may include the standard temperature condition and the test temperature conditions.

The target operating temperature range of the display panel may cover the extreme temperatures of all possible application scenarios of the display panel, such as normal temperature, low temperature, high temperature, etc.

The target operating temperature range may be divided into different temperature levels, and the temperature levels may include normal, high or low-temperature levels, that is, include the standard temperature condition and the test temperature conditions. Therefore, the Gamma data of the reference samples at the different temperature levels may be obtained to calculate the compensation data and achieve Gamma compensation for temperature.

In the present embodiment of the present disclosure, multiple different temperature levels may be obtained by dividing the target operating temperature range of the display panel into temperature levels, which facilitates subsequent testing of the reference samples under multiple different temperature levels such as standard temperature conditions or test temperature conditions. Comprehensive coverage testing of multiple different temperature levels within the target operating temperature range may be achieved, which is conducive to improving the accuracy of test data and Gamma compensation data. Further, there may be no need to test every temperature point value, simplifying the testing process and improving debugging efficiency.

In some embodiments, the order of execution of S100 and S101 may be exchanged. For example, in another embodiment, S101 may be executed first and S100 may be executed later, which is not limited here.

Other processes shown in FIG. 5 may be same as FIG. 1, and may be understood with reference to the previous descriptions in FIG. 1, which will not be described again here.

In some embodiments, the target operating temperature range may be [TL, TH], where TL represents the low-temperature limit value of the target operating temperature range, and TH represents the high-temperature limit value of the target operating temperature range. The low-temperature limit value and the high-temperature limit value may define the target operating temperature range of the display panel. For example, taking the Celsius temperature as an example, TL may be a temperature value below zero, and TH may be a temperature value above zero. The temperature range represented by [TL, TH] may include the normal temperature as well as high or low temperatures, covering the temperatures of all possible application scenarios of the display panel.

In some embodiments, the target operating temperature range may be [−40° C., 85° C.].

In the present embodiment, the low-temperature limit of the target operating temperature range may be −40° C., and the high-temperature limit of the target operating temperature range may be 85° C. Correspondingly, the display panel to whom the Gamma debugging method is applied may satisfy the Gamma compensation requirement for temperature within the range of −40° C.~85° C., such that the target Gamma curve may be satisfied in the range of −40° C.~85° C. The display accuracy and visual effects may be improved.

In other embodiments, the target operating temperature range may also be other temperature ranges, which are not limited here.

Figure 6:
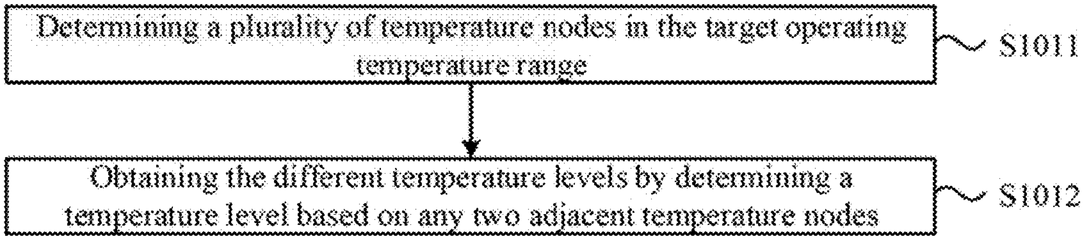
FIG. 6 illustrates a flowchart of a portion of S101 in FIG. 5, consistent with various disclosed embodiments in the present disclosure.

In some embodiments shown in FIG. 6 which is a flowchart of S101 in FIG. 5, based on FIG. 5, S101 may include:

- S1011: determining a plurality of temperature nodes in the target operating temperature range; and
- S1022: determining a temperature level based on two adjacent temperature nodes of the plurality of temperature nodes, to obtain the different temperature levels.

In one embodiment, the plurality of temperature nodes may include TL, T1, T2, . . . , TN, and TH from low to high. The plurality of temperature nodes may be used to define and divide different temperature levels. In the present disclosure, the number of temperature nodes is not limited, and may be set according to the requirements of the Gamma debugging method to meet the requirements of test accuracy and test efficiency.

For example, in one embodiment, [TL, TH] may be [−40° C., 85° C.]. The plurality of temperature nodes may include: −40° ° C., −30° C., −20° C., −10° C., 5° C., 15° C., 25° C., 45° C., 65° C., and 85° C.

The different temperature levels may include: [TL,T1), [T1,T2), . . . [TN,TH].

For example, in one embodiment, the different temperature levels may include [−40° C., −30° C.), [−30° C., −20° C.), [−20° C., −10° C.), [−10° C., 5° C.), [5° C., 15° C.), [15° C., 25° C.), [25° C., 45° C.), [45° C., 65° C.), [65° C., 85° C.].

In the present embodiment of the present disclosure, the multiple different temperature levels may be obtained by dividing the target operating temperature range, which facilitates subsequent testing of the reference samples under multiple different temperature levels such as standard temperature conditions and test temperature conditions. Comprehensive coverage testing of multiple different temperature levels within the target operating temperature range may be achieved, which is beneficial to improving the accuracy of test data and Gamma compensation data. Further, there may be no need to test every temperature point value, simplifying the testing process and improving debugging efficiency.

In some embodiments, the different temperature levels may include a first temperature level and a second temperature level. Each temperature in the first temperature level may be smaller than each temperature in the second temperature level. The temperature change corresponding to the first temperature level is ΔT1. The temperature change corresponding to the second temperature level is ΔT2, which may satisfy ΔT1≤ΔT2.

Among the first temperature level and the second temperature level, the first temperature level may correspond to a lower temperature level, and the second temperature level may correspond to a higher temperature level. Based on the characteristics of the display panel, that is, the brightness change of the display panel may be more severe at low temperature, more temperature nodes may be set in the low-temperature section such that the temperature change ΔT1 of the low-temperature level is less than or equal to the temperature change ΔT2 of the high-temperature level. Therefore, accurate testing and compensation may be implemented for Gamma data in all temperature ranges, improving the accuracy of Gamma compensation in all temperature ranges and improving visual effects.

For example, in one embodiment, [TL, TH] may be [−40° C., 85° C.]. Correspondingly, ΔT1 may be 10° C. and ΔT2 may be 15° C. or 20° C.; or ΔT1 may be 15° C. and ΔT2 may be 20° C., which is not limited here.

In other embodiments, when the target operating temperature range is another temperature range, ΔT1 and ΔT2 may also be set to other values, which are not limited here.

Figure 7:
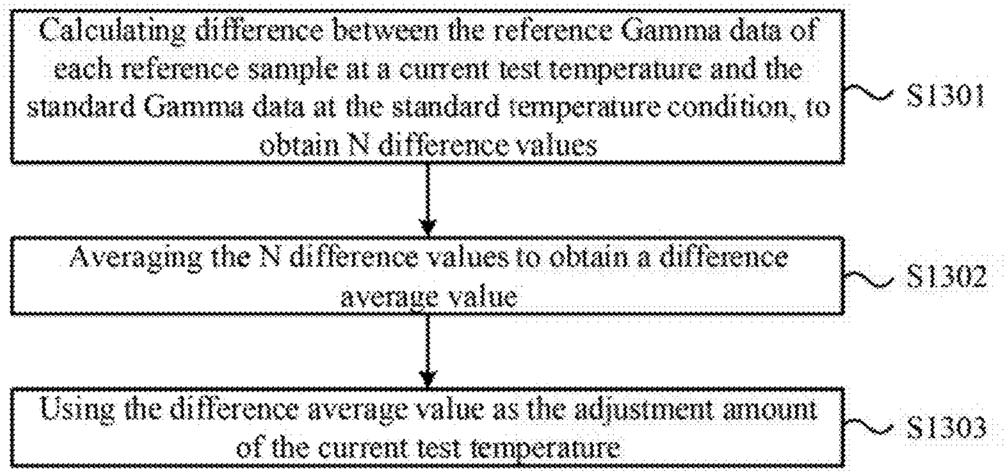
FIG. 7 illustrates a flowchart of S130 in FIG. 1, consistent with various disclosed embodiments in the present disclosure.

In one embodiment shown in FIG. 7 which is a flowchart of S130 in FIG. 1, based on FIG. 1, S130 in the Gamma debugging method may include:

- S1301: calculating the difference between the reference Gamma data of each reference sample under a current test temperature condition and the standard Gamma data under the standard temperature condition, to obtain N difference values;
- S1302: averaging the N difference values to obtain an average difference value; and
- S1303: using the average difference value as the adjustment amount.

There may be multiple test temperature conditions, and calculations in S1301-S1303 may need to be performed for each test temperature condition. For each current test temperature condition, the difference between the reference Gamma data of each reference sample in the N reference samples relative to the standard Gamma data under the standard temperature condition may be calculated, and the difference may be obtained by subtracting the standard Gamma data from the reference Gamma data or subtracting the reference Gamma data from the standard Gamma data, which is not limited here. Therefore, the N difference values for the current test temperature condition may be obtained.

Subsequently, for each current test temperature condition, the N difference values may be averaged. That is, the N difference values may be summed and then divided by N, to obtain the average difference value, for the current test temperature condition.

For each current test temperature condition, the average difference value may be used as the Gamma adjustment amount of the current test temperature condition, to obtain the Gamma compensation data.

In the present disclosure, the difference may be calculated based on the standard Gamma data obtained by testing the N reference samples under the standard temperature condition and the reference Gamma data obtained by testing under the test temperature conditions, and the average value may be further calculated. Finally, the average difference value may be used as the Gamma adjustment amount. The difference between different reference samples may be reduced through statistical calculations and the debugging accuracy may be improved.

In one embodiment, S140 in FIG. 1 may include:

calculating Gamma difference average value for different preset temperatures according to a first operation rule.

The standard temperature condition and the test temperature conditions may include several different temperature levels. Testing the reference samples under the standard temperature condition and the test temperature conditions may be understood as selecting temperature points at several different temperature levels respectively and testing the reference samples at the selected temperature points to obtain the standard Gamma data and reference Gamma data. Further, the Gamma adjustment amounts at the temperature points corresponding to the test temperature condition may be calculated.

The preset temperatures may be understood as temperatures within the target operating temperature range other than the selected temperature points. The average Gamma difference values at the preset temperatures may be the Gamma compensation data at the preset temperatures, that is, the Gamma adjustment amounts. Based on this, to obtain the Gamma adjustment amounts at temperatures other than the selected temperature points, calculation may be performed according to the first operation rule. For example, the first operation rule may be an interpolation method or a function fitting method, or may be other operation rules known to those skilled in the art, which is not limited here.

In the embodiments of the present disclosure, by calculating the average Gamma difference values at different preset temperatures according to the first operation rule, the Gamma adjustment amounts at other temperatures may be also obtained on the basis of calculating the Gamma adjustment amounts under the test temperature conditions. The Gamma adjustment data at different temperatures may be enriched through calculation without increasing testing, thereby improving the comprehensive coverage of the Gamma compensation data relative to the target operating temperature range.

In some embodiments, in the Gamma debugging method, the number N of the reference samples may meet $15 \leq N \leq 20$.

The position difference of the display panels in the display motherboard may lead to differences in their brightness characteristics in response to temperature changes. To reduce the impact of the single panel characteristic difference on the Gamma compensation data, display panels may be selected at different positions of the display motherboard as the reference samples. In one embodiment, the number of display panels may be controlled to about 15 to 20 pieces, that is, the number N of the reference samples may satisfy $15 \leq N \leq 20$. For example, the value of N may be 15, 20, 18 or other values, which is not limited here.

In the embodiments of the present disclosure, the number of reference samples may be controlled according to the difference in display panel characteristics at each position of the display motherboard. For example, the number of reference samples may be about 15 to 20 pieces. The test accuracy may be improved while ensuring that the workload of testing and statistical calculations are not too heavy, thus achieving higher debugging efficiency.

In other embodiments, when the area of the display master and/or the display panel is larger or smaller, the number of reference samples may also be other values to balance the differences in panel characteristics, improve debugging accuracy, and take into account debugging efficiency. There is no limit here.

In some embodiments, in the Gamma debugging method, the target Gamma curve may include a Gamma 2.2 curve.

In the present disclosure, the Gamma debugging method may perform Gamma compensation for the display panel at different temperatures, such that the adjustment accuracy of the Gamma 2.2 curve at different temperatures may be controlled to be within ±0.3, which may meet the needs for precise control of chroma and grayscale linearity, and also meet the needs of mass production and debugging of production lines.

In other embodiments, the target Gamma curve may also be other Gamma curves known to those skilled in the art, which will not be described in detail or limited here.

Figure 8:
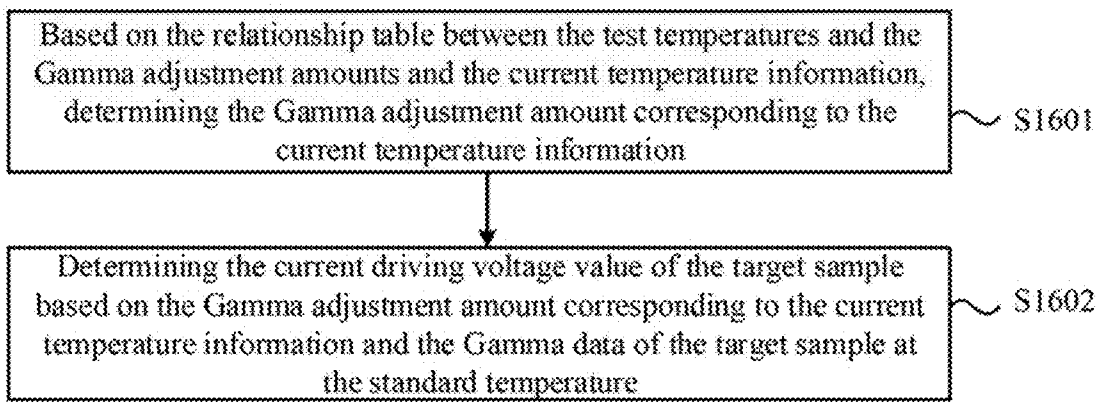
FIG. 8 illustrates a flowchart of S160 in FIG. 1, consistent with various disclosed embodiments in the present disclosure.

In some embodiments shown in FIG. 8 which is a flowchart of S160 in FIG. 1, based on FIG. 1, in the Gamma debugging method, S160 may include:

S1601: based on the relationship table between the test temperatures and the Gamma adjustment amounts, and the current temperature information, determining the Gamma adjustment amount corresponding to the current temperature information; and S1602: determining the current driving voltage value of the target sample based on the Gamma adjustment amount corresponding to the current temperature information and the Gamma data of the target sample at the standard temperature.

The relationship table between the test temperatures and the Gamma adjustment amount may include a relationship between the temperature and the Gamma adjustment amount. Based on this combined with the current temperature information, the corresponding Gamma adjustment amount may be determined using the relationship table. For example, based on the different structural forms of the association relationship, such as a table form or a function form, table lookup or function calculation may be used to determine the Gamma adjustment amount corresponding to the current temperature information.

The Gamma adjustment amount corresponding to the current temperature information may be used to compensate the Gamma data of the target sample at the standard temperature, for example, by summing the two, to obtain the compensated Gamma data of the target sample corresponding to the current temperature information. The compensated Gamma data may be the current driving voltage value. Correspondingly, the Gamma adjustment amount may be a voltage adjustment amount, the target sample may be a mass-produced display panel, and the Gamma data at standard temperature may be voltage values corresponding to different brightnesses of the target Gamma curve at the normal temperature.

In the present disclosure, the Gamma compensation at different temperatures may be performed based on the Gamma data of the mass-produced display panel at the normal temperature. The requirement of mass-produced Gamma debugging of the production line may be satisfied to improve the visual effects.

In some embodiments, the Gamma debugging method may be used for Gamma compensation of different display panels as a whole at different temperatures. For example, in some embodiment, under standard temperature conditions, the temperatures of different local areas of the reference sample may be within the standard temperature conditions; or, under test temperature conditions, the statistical temperatures of different local areas of the reference samples may be within the test temperature conditions. The statistical temperatures may include temperature maximum, temperature minimum, or temperature average.

In this Gamma debugging method, the temperature of different local areas of the reference samples may be adjusted to meet the testing requirements of the Gamma data. Exemplarily, the method of adjusting different local temperatures of the reference samples may include: setting temperature control devices respectively for different local areas, and adjusting the temperatures of the temperature control devices to adjust the temperatures of the corresponding different local areas of the display panel. In other embodiments, other methods known to those skilled in the art may also be used to achieve temperature control of different local areas of the reference samples, which will not be described in detail or limited here.

In the embodiments of the present disclosure, the above temperature control may be helpful to improve the test accuracy of the standard Gamma data and the reference Gamma data, thereby improving the accuracy of the Gamma adjustment amount. The control accuracy of the Gamma debugging method and the visual effect may be improved.

In some embodiments, the Gamma debugging method may perform Gamma compensation for the ambient temperature of the display panel application. For example, the reference samples may include a display panel, and the temperature may include the ambient temperature where the display panel is located.

When the ambient temperature of the display panel is not at the standard temperature, based on the correlation between the test temperature and the Gamma adjustment amount, the Gamma compensation amount corresponding to the current ambient temperature may be determined, and the Gamma compensation amount may be used to compensate for the Gamma data of the display panel at the standard temperature. Therefore, the Gamma data of the target Gamma curve of the display panel under the current ambient temperature may be obtained, thereby accurately emitting light and improving visual effects.

In some embodiments, the Gamma debugging method may perform Gamma compensation for local temperature differences of the display panel. For example, the reference samples may include a target local area of the display panel, and the temperature may include detected temperature of the target local area.

The temperatures of different local areas within the same display panel may be different, and regional differences may be compensated to improve the overall display visual effect of the display panel.

When the temperature of the target local area of the display panel is not at the standard temperature, based on the correlation between the test temperature and the Gamma adjustment amount, the Gamma compensation amount corresponding to the detected temperature of the target local area may be determined, and the Gamma compensation amount may be used to perform compensation for the Gamma data of the display panel at the standard temperature, to obtain the Gamma data of the target local area against the target Gamma curve at the current detection temperature. Therefore, different local areas of the display panel may be controlled to emit light precisely, improving the overall visual effect.

Figure 9:
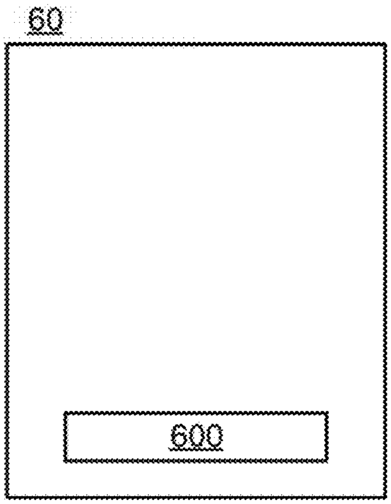
FIG. 9 illustrates a structural diagram of an exemplary display panel consistent with various disclosed embodiments in the present disclosure.

In one embodiment shown in FIG. 9 illustrating an exemplary display panel, in the display panel 60, the target local area may include an area covering an integrated circuit (IC), such as a driver chip, which is shown as 600 in FIG. 9. For example, in one embodiment, in a vehicle-mounted display screen, the display screen may lit for a long time and the IC may generate a large amount of heat. Therefore, the temperature abnormality in the target local area 600 may be more obvious. For example, the temperature in this area may be significantly higher than that in other areas, which may cause display abnormalities. Once the display in a local area is abnormal, it may also affect the driver's viewing of the display screen, thereby affecting the normal driving of the vehicle.

Therefore, one embodiment of the present disclosure also provides a Gamma debugging method for a local area of the display panel. In the present embodiment, when testing a reference sample, the temperature of the local area of the reference sample may be set to meet the standard temperature conditions and test temperature conditions, and the standard Gamma data and reference Gamma data of the local area corresponding to the test may be obtained. Also, the Gamma compensation amount may be further calculated to achieve Gamma compensation for the local area and improve the overall visual effect of the display panel.

Figure 10:
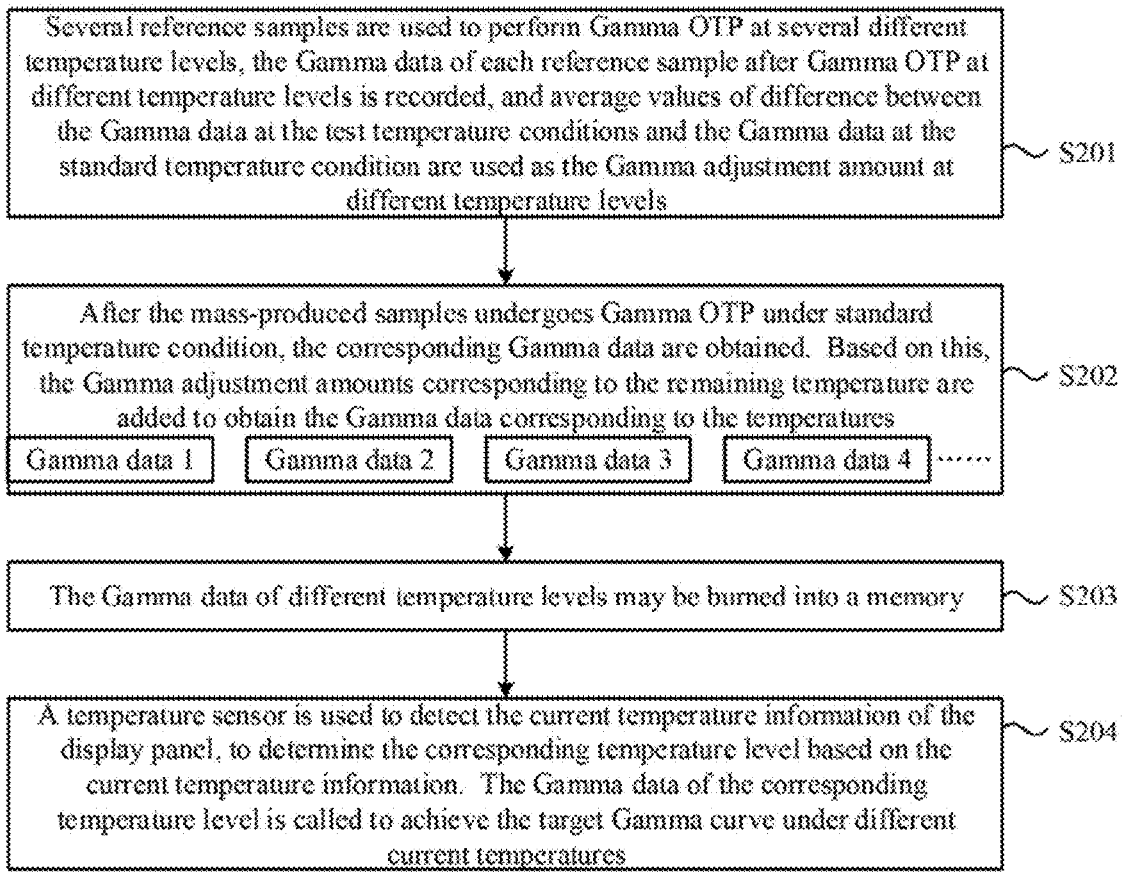
FIG. 10 illustrates another flowchart of an exemplary Gamma debugging method consistent with various disclosed embodiments in the present disclosure.

In one embodiment shown in FIG. 10 illustrating another flowchart of the Gamma debugging method, the Gamma debugging method may include S201 to S204.

In S201, several reference samples may be used to perform Gamma OTP at several different temperature levels, and the Gamma data of each reference sample after Gamma OTP at different temperature levels may be recorded. The average value of difference between the Gamma data at the test temperature conditions and the Gamma data at the standard temperature conditions may be used as the Gamma adjustment amount at different temperature levels.

The different temperature levels may include standard temperature conditions and test temperature conditions. The standard temperature condition may be normal temperature, and the test temperature condition may be other temperatures within the target use temperature range. OTP refers to the one-time program process, that is, the process of testing different voltages corresponding to different gray levels under the target Gamma curve and inputting these voltages into the IC of the display panel.

In the present disclosure, to achieve the target Gamma curve at different temperatures, different Gamma values may need to be used at different temperatures. The temperature levels may be divided within the target operating temperature range of the display panel as needed. And, at different temperature levels, Gamma OTP may be performed on the several (for example, N pieces of) reference samples at different temperature levels, and the Gamma data of each reference sample after Gamma OTP at different temperature levels may be recorded. Further, the Gamma difference di may be calculated, and the average value of the Gamma difference of different reference samples may be used as the Gamma compensation value $\bar{d}i$.

Since the luminous efficiency attenuation percentage of the corresponding red, green, and blue light-emitting devices has little difference between different display panels, the Gamma compensation value di may be used as the Gamma adjustment amount at different temperature levels.

In S202, after the mass-produced samples undergo Gamma OTP under the standard temperature condition, the corresponding Gamma data may be obtained. Based on this, the Gamma adjustment amounts corresponding to the remaining temperatures may be added to obtain the Gamma data corresponding to the temperatures, such as Gamma data 1, Gamma data 2, Gamma data 3, Gamma data 4, . . . .

The mass-produced samples may be used as target samples, and the standard temperature condition may be normal temperature. For the mass-produced samples, the corresponding Gamma data may be obtained after Gamma OTP at the normal temperature. And by adding the Gamma adjustment amount at the corresponding temperature, the Gamma data at the corresponding temperature may be obtained. For example, Gamma data 1, Gamma data 2, Gamma data 3, Gamma data 4, . . . may respectively represent the Gamma data corresponding to different temperatures that meet the target Gamma curve.

In S203, the Gamma data of different temperature levels may be burned into a memory.

The Gamma data corresponding to the above different temperatures that meet the target Gamma curve may be burned into the IC or memory, such as a flash memory (Flash), to be called when the mass-produced samples are subsequently used.

In S204, a temperature sensor may be used to detect the current temperature information of the display panel, to determine the corresponding temperature level based on the current temperature information. Further, the Gamma data of the corresponding temperature level may be called to achieve the target Gamma curve under different current temperatures.

The temperature sensor may be used to read the current temperature information of the display panel and different Gamma data may be called at different temperature levels. Therefore, Gamma compensation at different temperatures may be implemented, to achieve the display effect that meets the target Gamma curve at different temperatures.

In one embodiment, the current temperature information may be the ambient temperature of the display panel to realize the overall compensation of the display panel. In some other embodiments, the current temperature information may be the temperatures of multiple different local areas of the display panel to realize the sub-regional compensation of the display panel. The present disclosure has no limit on this.

In the present disclosure, several reference samples may be used to perform Gamma OTP at different temperatures, and the difference $d_i$ of the Gamma values of these samples after Gamma OTP at different temperatures may be recorded. The average value of these differences $d_i$ may be used as the Gamma adjustment amounts at different temperatures. The Gamma OTP may be performed on the mass-produced display panel at the normal temperature. The Gamma data of the display panel at normal temperature may be added to the Gamma adjustment amounts associated with the detected current temperature information may be used as the Gamma data for the remaining set temperatures. Therefore, piece by piece adjustments at different temperatures and Gamma debugging on each display panel may be avoided. Based on the Gamma data of each display panel under the normal temperature, targeted Gamma compensation, that is, color brightness compensation, may be performed at different temperatures, greatly avoiding the differences between different panels. The problem that the production line cannot perform Gamma OTP at different temperatures for each display panel may be solved, and also the problem that the public version of Gamma data cannot be used at different temperatures because of inter-chip differences may be solved.

Figure 11:
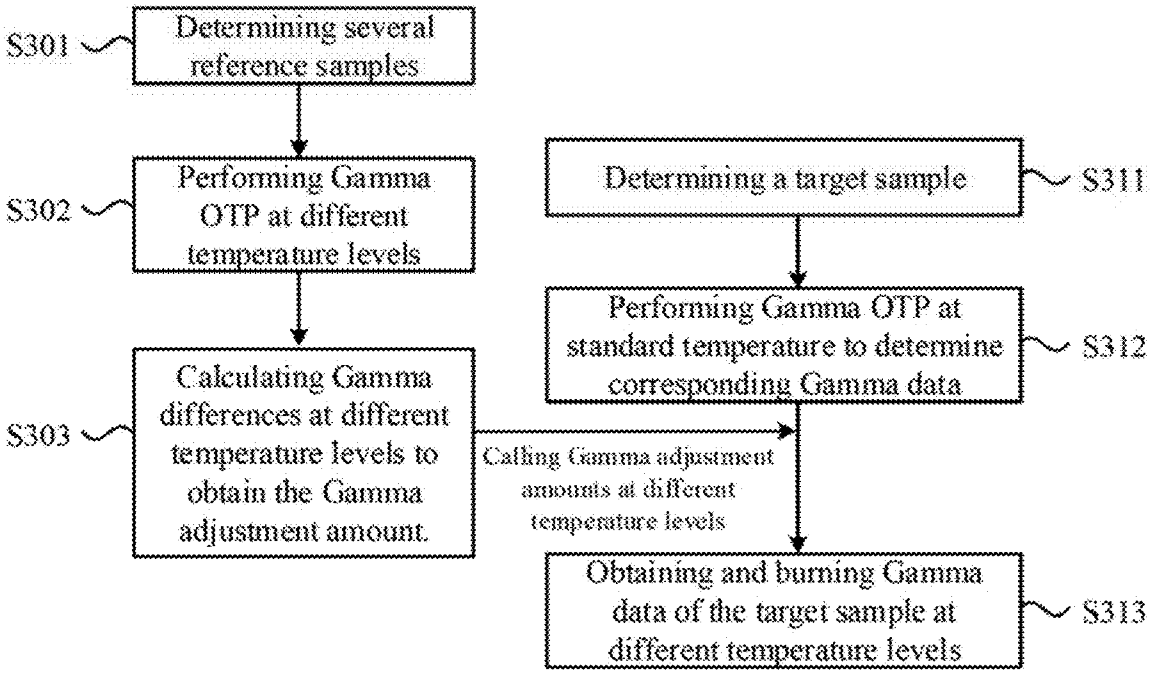
FIG. 11 illustrates another flowchart of an exemplary Gamma debugging method consistent with various disclosed embodiments in the present disclosure.

In another embodiment shown in FIG. 11 which is a flowchart of another Gamma debugging method, the Gamma debugging method may include S301 to S313.

In S301, several reference samples may be determined.

For example, in one embodiment, N reference samples may be determined from a plurality of display panels cut from at least one display motherboard.

In S302, Gamma OTP may be performed at different temperature levels.

In one embodiment, tests may be performed on the reference samples at the standard temperature condition and a plurality of different test temperature conditions, to obtain corresponding Gamma data.

For example, in one embodiment, reference Gamma data of the N reference samples at different temperature levels may be as shown in Table 1.

TABLE 1

| Gamma data of the N reference samples | | | | | |
|---|---|---|---|---|---|
| | T01 | T02 | . . . | Tm-1 | Tm |
| 1 | G1, 1 | G1, 2 | . . . | G1, m-1 | G1, m |
| . . . | . . . | . . . | . . . | . . . | . . . |
| N | GN, 1 | GN, 2 | . . . | GN, m-1 | GN, m |

In Table 1, the first row header represents m temperature levels, the first column header represents the number of the N reference samples, and Gi,j represents the Gamma data of one reference sample numbered i at one temperature level j, where the value of i is 1, . . . , N, and the value of j is 1, . . . , m. For example, T01 may represent the standard temperature level, such as normal temperature; and each of T02~Tm may represent a test temperature level.

In S303, Gamma differences at different temperature levels may be calculated to obtain the Gamma adjustment amount.

For example, in one embodiment, the Gamma data of the N reference samples at different temperature levels may be used to calculate the differences between the measured reference Gamma data under the test temperature conditions and the standard Gamma data under the standard temperature condition, and the differences may be averaged to obtain the Gamma difference average values. The Gamma difference average values may be used as the Gamma adjustment amounts.

For example, the Gamma differences corresponding to the N reference samples may be as shown in Table 2, and the Gamma adjustment amounts are shown in Table 3.

TABLE 2

| Gamma differences of the N reference samples | | | | | |
|---|---|---|---|---|---|
| | T01 | T02 | . . . | Tm-1 | Tm |
| 1 | 0 | d1, 2 | . . . | d1, m-1 | d1, m |
| . . . | . . . | . . . | . . . | . . . | . . . |
| N | 0 | dN, 2 | . . . | dN, m-1 | dN, m |

In Table 2, the first row header represents m temperature levels, the first column header represents the number of the N reference samples, and di,p represents the Gamma difference of one reference sample numbered i at one temperature level p, where the value of i is 1, . . . , N, and the value of p is 1, . . . , m.

TABLE 3

| Gamma adjustment amounts of the N reference samples | | | | | |
|---|---|---|---|---|---|
| | T01 | T02 | . . . | Tm-1 | Tm |
| Gamma adjustment amount | 0 | $\bar{d}2$ | . . . | $\bar{d}m$-1 | $\bar{d}m$ |

In the present disclosure, the Gamma adjustment amounts determined based on the reference samples may be used as the Gamma compensation amounts of the target samples at different temperature levels, to achieve Gamma compensation with respect to the target Gamma curve at different temperatures and improving visual effects.

In S311, a target sample may be determined.

For example, in one embodiment, the target sample may be a display panel mass-produced on a production line.

In S312, Gamma OTP may be performed at standard temperature to determine the corresponding Gamma data.

For example, in one embodiment, a Gamma test may be performed on the display panel at the normal temperature to obtain the Gamma data for the target Gamma curve at the normal temperature.

In S313, the Gamma data of the target sample at different temperature levels may be obtained and burned.

For example, in one embodiment, the Gamma adjustment amounts determined based on the reference samples at different temperature levels may be called, to compensate the Gamma data at the normal temperature and obtain Gamma data that satisfies the target Gamma curve at different temperature levels. Further, the Gamma data that meets the target Gamma curve may be burned.

In the present disclosure, Gamma compensation at different temperature levels may be performed based on the Gamma data of the mass-produced display panel at the normal temperature. The Gamma debugging requirements of the mass production of the production line may be satisfied. For example, for the Gamma 2.2 curve, the adjustment accuracy may be controlled within ±0.3, meeting the requirements for precise control of chroma and grayscale linearity.

The present disclosure also provides a Gamma debugging device. The Gamma debugging device may be used to execute any Gamma debugging method provided by various embodiments of the present disclosure, and may have corresponding advantages. For the details, references may be made to the previous embodiments, which will not be repeated here.

Figure 12:
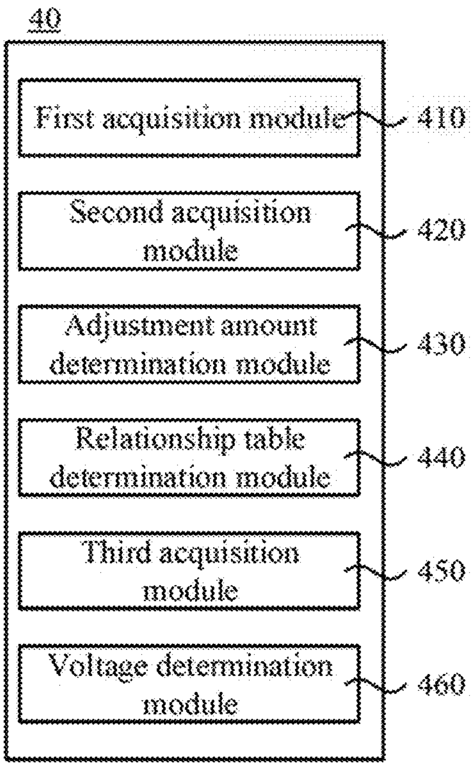
FIG. 12 illustrates a structural diagram of an exemplary Gamma debugging device consistent with various disclosed embodiments in the present disclosure.

In one embodiment shown in FIG. 12 illustrating a structure of a Gamma debugging device, the Gamma debugging device 40 may include: a first acquisition module 410, configured to test N reference samples under the standard temperature condition and obtain standard Gamma data of the N reference samples with respect to the target Gamma curve, where N≥1 and N is an integer; a second acquisition module 420, configured to test the N reference samples under test temperature conditions and obtain reference Gamma data of the N reference samples; an adjustment amount determination module 430, configured to determine Gamma adjustment amounts of the reference samples under the test temperature conditions according to the reference Gamma data and standard Gamma data of the N reference samples; a relationship table determination module 440, configured to establish a relationship table between the test temperatures and the Gamma adjustment amounts; a third acquisition module 450, configured to obtain Gamma data of a target sample at the standard temperature, and obtain the current temperature information of the target sample; and, a voltage determination module 460, configured to determine a current driving voltage value of the target sample based on the Gamma data of the target sample at the standard temperature and the Gamma adjustment amount corresponding to the current temperature information.

In the Gamma debugging device provided by the present disclosure, Based on the Gamma data of the N reference samples under the standard temperature condition and test temperature conditions with respect to the target Gamma curve, the Gamma adjustment amounts corresponding to different test temperature conditions may be determined, and a relationship table between the test temperatures and the Gamma adjustment amounts may be further established. Subsequently, for the target sample, the Gamma data at the standard temperature may be obtained, and the Gamma adjustment amounts may be used for compensation to obtain the current driving voltage value corresponding to current temperature information of the target sample. The application scenarios such as the impact of temperature conditions on light-emitting devices may be improved. Visual effects may be improved, the target Gamma curve may be satisfied, and display accuracy may be improved.

The present disclosure also provides a display panel driving method. The display panel driving method may be performed based on any Gamma debugging method provided by various embodiments of the present disclosure, to achieve Gamma compensation with respect to different temperatures and improve the display accuracy of the display panel.

Figure 13:
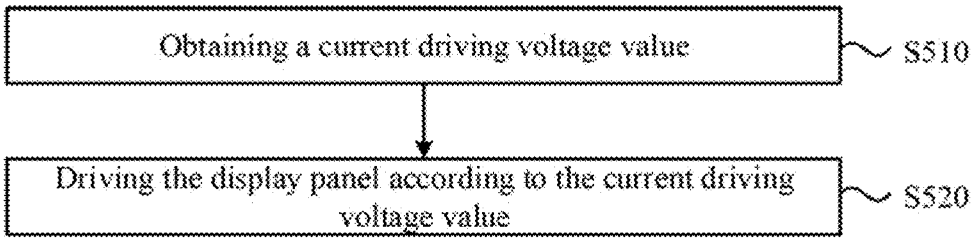
FIG. 13 illustrates a flowchart of an exemplary driving method of a display panel consistent with various disclosed embodiments in the present disclosure.

In one embodiment shown in FIG. 13 which is a flowchart of a display panel driving method, the method may include:

S510: obtaining a current driving voltage; and

S520: driving the display panel according to the current driving voltage.

The obtained current driving voltage may be a driving voltage determined based on any of the Gamma debugging methods provided by various embodiments of the present disclosure and matched with the current temperature information. The driving voltage may be obtained based on the register value (that is, the burned Gamma data) corresponding to the data voltage.

In the present disclosure, the current driving voltage may be used to drive and control the display panel, such that the display panel is able to meet the target Gamma curve, meeting the display requirements and improving the control accuracy of the visual effect.

The present disclosure also provides a display panel. The display panel may include a control component used to execute any Gamma debugging method provided by various embodiments of the present disclosure, and may have corresponding advantages.

Figure 14:
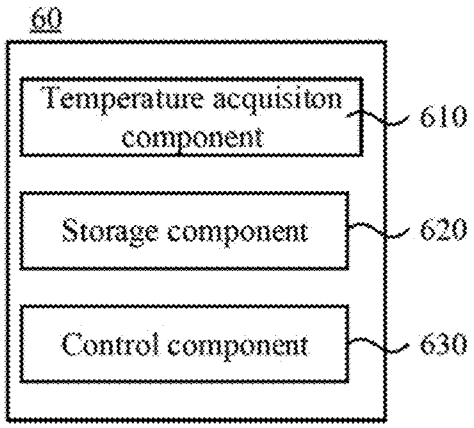
FIG. 14 illustrates another structural diagram of an exemplary display panel consistent with various disclosed embodiments in the present disclosure.

In one embodiment shown in FIG. 14, the display panel 60 may include: a temperature acquisition device 610, a storage component 620 and a control component 630. The temperature acquisition device 610 may be used to obtain the current temperature of the display panel 60 and transmit it to the control component 630. The storage component 620 may be configured to at least store the relationship table and Gamma data at the standard temperature. The control component 630 may be used to obtain the current temperature, the relationship table and the Gamma data under the standard temperature to perform any Gamma debugging method or driving method provided in the above embodiments of the present disclosure.

The temperature acquisition component 610 may be a component with a temperature detection function, such as a temperature sensor or a temperature and humidity sensor. The storage component 620 may be a component with a storage function such as an IC, a flash memory, a register, etc. The control component 630 may be a controller, a processor, an IC, or other components with data processing functions. The temperature acquisition component 610 and the storage component 620 may be both connected to the control component 630. The temperature acquisition component 610 may transmit the acquired current temperature to the control component 630, and the control component 630 may call the relationship table between the temperatures and the Gamma adjustment amounts stored in the storage component 620, and the Gamma data of the display panel under the normal temperature for the target Gamma curve. Based on this, the control component 630 may use the relationship table to determine the Gamma compensation amount based on the obtained current temperature, perform compensation on the basis of the Gamma data under the normal temperature to obtain the Gamma data under the current temperature that meets the target Gamma curve, and then obtain the current driving voltage, to realize the driving control of the display panel and meet the visual effect requirements.

Figure 15:
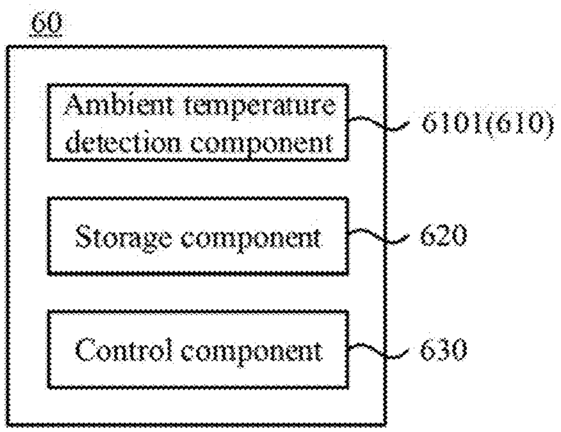
FIG. 15 illustrates another structural diagram of an exemplary display panel consistent with various disclosed embodiments in the present disclosure.

In some other embodiments as shown in FIG. 15 illustrating another display panel, based on FIG. 14, in the display panel 60, the temperature acquisition component 610 may include an ambient temperature detection component 6101 disposed in the environment where the display 60 is located. The ambient temperature detection component 6101 may be used to detect the ambient temperature where the display panel 60 is located.

The ambient temperature detection component 6101 may detect the ambient temperature of the display panel 60 and transmit it to the control component 630. The control component 630 may control the display panel 60 as a whole based on the ambient temperature. For example, the display panel may be applied to scenarios where the ambient temperature is uniform as a whole or the temperature difference at different locations of the display panel is small, to achieve precise and simple control of the display panel.

Figure 16:
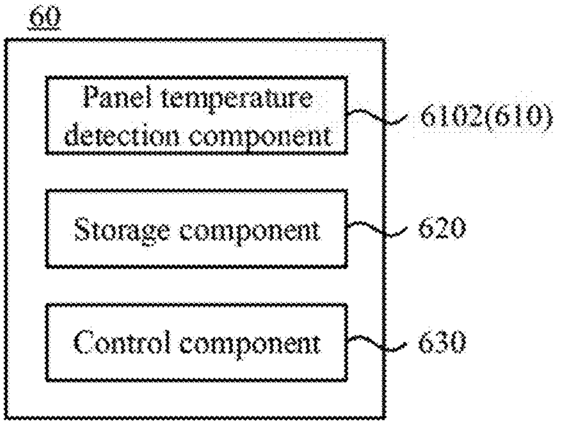
FIG. 16 illustrates another structural diagram of an exemplary display panel consistent with various disclosed embodiments in the present disclosure.

In some other embodiments as shown in FIG. 16 illustrating another display panel, based on FIG. 14, in the display panel 60, the temperature acquisition component 610 may include panel temperature detection components 6102 disposed at different local areas of the display panel 60. The panel temperature detection components 6102 may be used to detect the temperatures of target local areas of the display panel 60.

The panel temperature detection components 6102 may detect the temperatures of local areas of the display panel. The local areas may be areas with significant temperature changes, or may also be understood as different areas with large temperature differences. Therefore, through regional compensation, the overall viewing effect may be improved.

Figure 17:
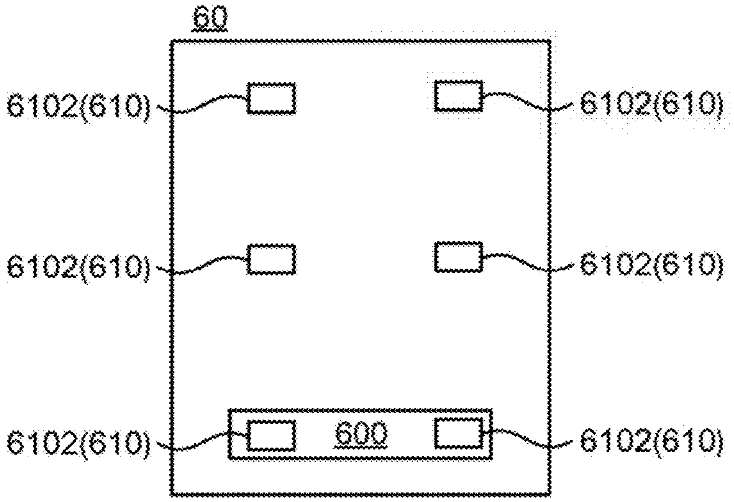
FIG. 17 illustrates another structural diagram of an exemplary display panel consistent with various disclosed embodiments in the present disclosure.

In some other embodiments as shown in FIG. 17 illustrating another display panel, based on FIG. 14, in the display panel 60, the panel temperature detection components 6102 may be disposed inside and outside the target local area 600 to respectively detect the temperature of the target local area and other local areas except the target local area, to achieve regional compensation and improve the overall visual effect.

In other embodiments, the panel temperature detection components 6102 may also be dispersed indiscriminately at different positions of the display panel 60 to detect the temperature of different local areas of the display panel 60 in an all-round way to achieve fine compensation in different areas and improve the overall visual effect.

The present disclosure also provides a display device. The display device may include a display panel provided by various embodiments of the present disclosure, and may have corresponding advantages.

Figure 18:
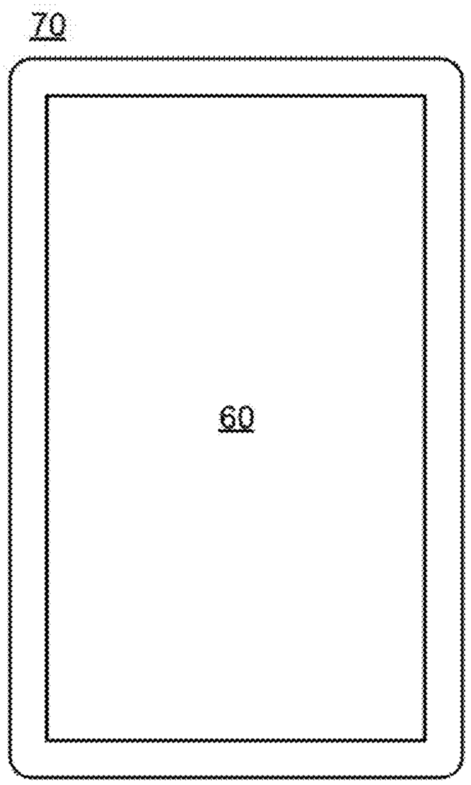
FIG. 18 illustrates a structural diagram of an exemplary display device consistent with various disclosed embodiments in the present disclosure.

In some embodiments shown in FIG. 18 which illustrates an exemplary display device, the display device 70 may include a display panel 60 provided by various embodiments of the present disclosure The display device 70 may be, but is not limited to, a cell phone, a tablet, a vehicle computer, a wearable smart device with a display function, or another structural component with a display function.

In some other embodiments, the display device 70 may include other structural functional components known to those skilled in arts, and is not limited in the present disclosure.

In this document, relational terms such as "first" and "second" are only used to distinguish one entity or operation from another entity or operation and do not necessarily require or imply that there is a relationship between these entities or operations. There is no such actual relationship or sequence. Furthermore, the terms "comprises," "comprises," or any other variations thereof are intended to cover a non-exclusive inclusion such that a process, method, article, or apparatus that includes a list of elements includes not only those elements, but also those not expressly listed other elements, or elements inherent to the process, method, article or equipment. Without further limitation, an element defined by the statement "comprises a . . . " does not exclude the presence of additional identical elements in a process, method, article, or apparatus that includes the stated element.

Various embodiments have been described to illustrate the operation principles and exemplary implementations. It should be understood by those skilled in the art that the present disclosure is not limited to the specific embodiments described herein and that various other obvious changes, rearrangements, and substitutions will occur to those skilled in the art without departing from the scope of the disclosure. Thus, while the present disclosure has been described in detail with reference to the above described embodiments, the present disclosure is not limited to the above described embodiments, but may be embodied in other equivalent forms without departing from the scope of the present disclosure, which is determined by the appended claims.

What is claimed is:

1. A Gamma debugging method, comprising:

under a standard temperature condition, testing N reference samples from a plurality of display panels to obtain standard Gamma data of the N reference samples with respect to a target Gamma curve, wherein $N \geq 2$, and N is an integer, and the plurality of display panels is obtained from different locations of at least one display motherboard;

under test temperature conditions, testing the N reference samples to obtain reference Gamma data of the N reference samples;

calculating a difference value between reference Gamma data of each reference sample under a test temperature condition and standard Gamma data under each standard temperature condition, to obtain N difference values under each standard temperature condition;

determining a Gamma adjustment amount under each test temperature condition by averaging the N difference valves calculated for the N reference samples from different locations of at least one display motherboard under each test temperature condition;

establishing a relationship table between test temperatures and Gamma adjustment amounts;

obtaining Gamma data of a target sample at the standard temperature condition, and obtaining current temperature information of the target sample; and based on the Gamma data of the target sample at the standard temperature condition and a Gamma adjustment amount corresponding to the current temperature information, determining a current driving voltage value for the target sample.

2. The Gamma debugging method according to claim 1, wherein:

each of the at least one display motherboard includes a central area, an edge area located on at least one side of the central area, and at least one intermediate area located between the central area and the edge area along a direction from the central area to the edge area; and determining at least one display panel in each of the center area, the middle area, and the edge area within a same display motherboard as the reference samples.

3. The Gamma debugging method according to claim 1, before testing the N reference samples, further including:

performing temperature level division within a target operating temperature range of the plurality of display panels, to obtain different temperature levels, wherein the temperature levels include the standard temperature condition and the test temperature conditions.

4. The Gamma debugging method according to claim 3, wherein:

the target operating temperature range is [TL, TH]; and perform the temperature level division within the target operating temperature range of the plurality of display panels to obtain the different temperature levels includes:

determining a plurality of temperature nodes in the target operating temperature range, wherein the plurality of temperature nodes include TL, T1, T2, . . . , TN, TH from low to high; and obtaining the different temperature levels by determining a temperature level based on any two adjacent temperature nodes, wherein the different temperature levels include: [TL, T1), [T1, T2), . . . [TN, TH].

5. The Gamma debugging method according to claim 4, wherein:

the different temperature levels include a first temperature level and a second temperature level;

each temperature in the first temperature level is smaller than each temperature in the second temperature level; and a temperature change corresponding to the first temperature level is $\Delta T1$, and a temperature change corresponding to the second temperature level is $\Delta T2$, wherein $\Delta T1 \leq \Delta T2$.

6. The Gamma debugging method according to claim 3, wherein:

the target operating temperature range is [−40° C., 85° C.].

7. The Gamma debugging method according to claim 1, wherein:

establishing the relationship table between the test temperatures and the Gamma adjustment amounts includes:

calculating average values of the Gamma difference at different preset temperatures according to a first operational rule.

8. The Gamma debugging method according to claim 1, wherein:

$$15 \leq N \leq 20.$$

9. The Gamma debugging method according to claim 1, wherein:

the target Gamma curve includes a Gamma2.2 curve.

10. The Gamma debugging method according to claim 1, wherein:

determining the current driving voltage value of the target sample based on the Gamma data of the target sample at the standard temperature and the Gamma adjustment amount corresponding to the current temperature information includes:

based on the relationship table between the test temperatures and the Gamma adjustment amounts and the current temperature information, determining the Gamma adjustment amount corresponding to the current temperature information; and determining the current driving voltage value of the target sample based on the Gamma adjustment amount corresponding to the current temperature information and the Gamma data of the target sample at the standard temperature.

11. The Gamma debugging method according to claim 1, wherein:

under the standard temperature condition, the temperatures of different local areas of the reference samples are within the standard temperature condition; and under the test temperature conditions, the statistical temperatures of different local areas of the reference samples are within the test temperature conditions, wherein the statistical temperatures include a maximum temperature value, a minimum temperature value or an average temperature value.

12. The Gamma debugging method according to claim 11, wherein:

the reference samples include a display panel, and the temperature includes an ambient temperature where the display panel is located; or the reference samples include a target local area of the display panel, and the temperature includes a detected temperature for the target local area.

13. A Gamma debugging device, comprising a memory and one or more processors, wherein the memory stores a computer program executable by the one or more processors, and when executing the computer program, the one or more processors are configured to perform:

under a standard temperature condition, testing N reference samples from a plurality of display panels to obtain standard Gamma data of the N reference samples with respect to a target Gamma curve, wherein $N \geq 2$, and N is an integer, and the plurality of display panels is obtained from different locations of at least one display motherboard;

under test temperature conditions, testing the N reference samples to obtain reference Gamma data of the N reference samples;

calculating a difference value between reference Gamma data of each reference sample under a test temperature condition and standard Gamma data under each standard temperature condition, to obtain N difference values under each standard temperature condition;

determining a Gamma adjustment amount under each test temperature condition by averaging the N difference valves calculated for the N reference samples from different locations of at least one display motherboard under each test temperature condition;

establishing a relationship table between test temperatures and Gamma adjustment amounts;

obtaining Gamma data of a target sample at the standard temperature condition and obtaining current temperature information of the target sample; and based on the Gamma data of the target sample at the standard temperature condition and a Gamma adjustment amount corresponding to the current temperature information, determining a current driving voltage value for the target sample.

14. A method of driving the display panel according to claim 1, comprising:

obtaining a current driving voltage value; and driving the display panel based on the current driving voltage value.

15. A display panel, comprising a temperature acquisition component, a storage component and a control component, configured to operate the method according to claim 1, wherein:

the temperature acquisition component is configured to obtain current temperature of the display panel and transmit it to the control component;

the storage component is configured to at least store a relationship table and standard temperature Gamma data; and the control component is configured to obtain the current temperature, the relationship table and the Gamma data at the standard temperature to execute.

16. The display panel according to claim 15, wherein:

the temperature acquisition component includes an ambient temperature detection component disposed in an environment where the display panel is located; and the ambient temperature detection component is configured to detect the ambient temperature of the display panel.

17. The display panel according to claim 15, wherein:

the temperature acquisition component includes panel temperature detection components disposed in different local areas of the display panel; and the panel temperature detection components are configured to detect a temperature of a target local area of the display panel.

18. A display device, comprising the display panel according to claim 15.

* * * * *